(12) United States Patent
Na

(10) Patent No.: US 6,700,844 B2
(45) Date of Patent: Mar. 2, 2004

(54) METHOD AND APPARATUS FOR MEASURING THE ECCENTRICITY OF AN OPTICAL DISK

(75) Inventor: Hyeung Chull Na, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 470 days.

(21) Appl. No.: 09/758,364

(22) Filed: Jan. 12, 2001

(65) Prior Publication Data

US 2001/0019524 A1 Sep. 6, 2001

(30) Foreign Application Priority Data

Jan. 12, 2000 (KR) .......................................... 2000-1407

(51) Int. Cl.$^7$ ................................................ G11B 3/90
(52) U.S. Cl. .................................. 369/53.14; 369/44.36
(58) Field of Search ........................... 369/44.25, 44.29, 369/44.27, 44.32, 44.34, 44.35, 44.36, 47.44, 47.45, 53.14, 53.28, 53.42

(56) References Cited

U.S. PATENT DOCUMENTS 5,014,256 A * 5/1991 Horie et al. ............. 369/44.35
6,147,944 A * 11/2000 Kwon et al. ............. 369/44.32
6,606,286 B1 * 8/2003 Maekawa ................ 369/47.17

* cited by examiner

Primary Examiner—Paul W. Huber
(74) Attorney, Agent, or Firm—Birch, Stewart, Kolasch & Birch, LLP

(57) ABSTRACT

A method and apparatus for measuring the eccentricity of an optical disk. The method for measuring the eccentricity of an optical disk in accordance with the present invention comprises the steps of activating tracking servo while the optical disk is rotating, detecting the center value of tracking error signal and setting the center value as a reference value, and detecting the eccentricity of the optical disk by comparing the center value and the tracking error signal received right after the reference value is set. The method in accordance with the present invention precisely measures the eccentricity of an optical disk and adjusts focus and track servo gains and disk rotation speed based upon the measured disk eccentricity, which provides stable data reproduction performance.

12 Claims, 5 Drawing Sheets

*Conventional Art*

METHOD AND APPARATUS FOR MEASURING THE ECCENTRICITY OF AN OPTICAL DISK

BACKGROUND OF THE INVENTION

1. Field of the Invention

The present invention relates to a method and apparatus for measuring the eccentricity of a rotating optical disk.

2. Description of the Related Art

Owing to errors in disk manufacturing process or imperfect clamping operation, most rotating optical disks inherently show eccentric rotation to some extent. The eccentricity impairs focusing and tracking control and may make normal data read-out impossible in the worst case.

FIG. 1 depicts a block diagram of a conventional optical disk drive with eccentricity compensation capability, comprising an optical pickup 20 for reproducing recorded signals from an optical disk 10, an R/F unit 30 for equalizing and shaping the RF signals reproduced from the optical disk 10 by the pickup 20, a sled motor 21 for moving the optical pickup 20 along the full length of the disk radius, a spindle motor 11 for rotating the optical disk 10, a drive unit 50 for driving the sled motor 21 and the spindle motor 11, a servo unit 40 for controlling the optical pickup 20 and the drive unit 50 using the rotation speed of the optical disk 10 and focus and tracking error signals outputted from the optical pickup 20, a digital signal processing unit 60 for retrieving original digital data from the binary data stream outputted by the RF unit 30 and for creating track crossing pulse signal (Cout) based on the tracking error signal, a microcomputer 70 for counting the track crossing pulse signal and for adjusting the rotation speed of the optical disk 10 based on the counting result.

When the optical disk 10 is inserted into a disk tray, which is a part of the optical disk drive mechanism, the optical disk 10 is clamped by a clamping device. Then, the microcomputer 50 commands the servo unit 40 to spin the optical disk 10 at a constant angular velocity. Controlled by the servo unit 40, the drive unit 50 provides electric current to rotate the spindle motor 11 and maintains the rotation velocity of the optical disk 10 constant.

The microcomputer 70 activates focusing control and then measures the eccentricity of the rotating optical disk 10. To this end, the digital signal processing unit 60 creates track crossing pulse signal (Cout) using the tracking error signal received from the optical pickup 20. The track crossing pulse signal (Cout) shows state transitions when the optical spot enters and exits the mirror area of the optical disk 10, as shown in FIG. 2.

The microcomputer 70 counts the track crossing pulse signal (Cout) during a predefined time interval and calculates the disk eccentricity using the counted number and disk rotation speed. Based on the obtained eccentricity, the microcomputer 70 performs predefined compensation processes such as servo gain setting.

In the conventional method mentioned above, however, the counted number of the track crossing pulse signal (Cout) may change depending upon the displacement of the objective lens with respect to the optical axis. That is, the calculated disk eccentricity might be incorrect around 'Z' portion of the tracking error signal of FIG. 2, which means that the misalignment between the center of the objective lens and the optical axis is much increased because of the disk vibration.

SUMMARY OF THE INVENTION

It is therefore an object of the present invention to provide a method and apparatus for precisely measuring the eccentricity of a rotating optical disk so that appropriate compensation can be performed according to the measured eccentricity.

The apparatus for measuring the eccentricity of an optical disk in accordance with the present invention comprises drive means for rotating the optical disk, reproducing means for reproducing recorded signals from the optical disk, servo means for performing focusing and tracking servo for the optical disk rotated by the drive means, and control means for detecting the amplitude of tracking error signal and for measuring the eccentricity of the optical disk based on the measured amplitude, the measurement being performed while the servo means is activated.

The method for measuring the eccentricity of an optical disk in accordance with the present invention comprises the steps of activating tracking servo while the optical disk is rotating, detecting the center value of tracking error signal and setting the center value as a reference value, and detecting the eccentricity of the optical disk by comparing the center value and the tracking error signal received right after the reference value is set.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFFERRED EMBODIMENTS

In order that the invention may be fully understood, preferred embodiments thereof will now be described with reference to the accompanying drawings.

Figure 1:
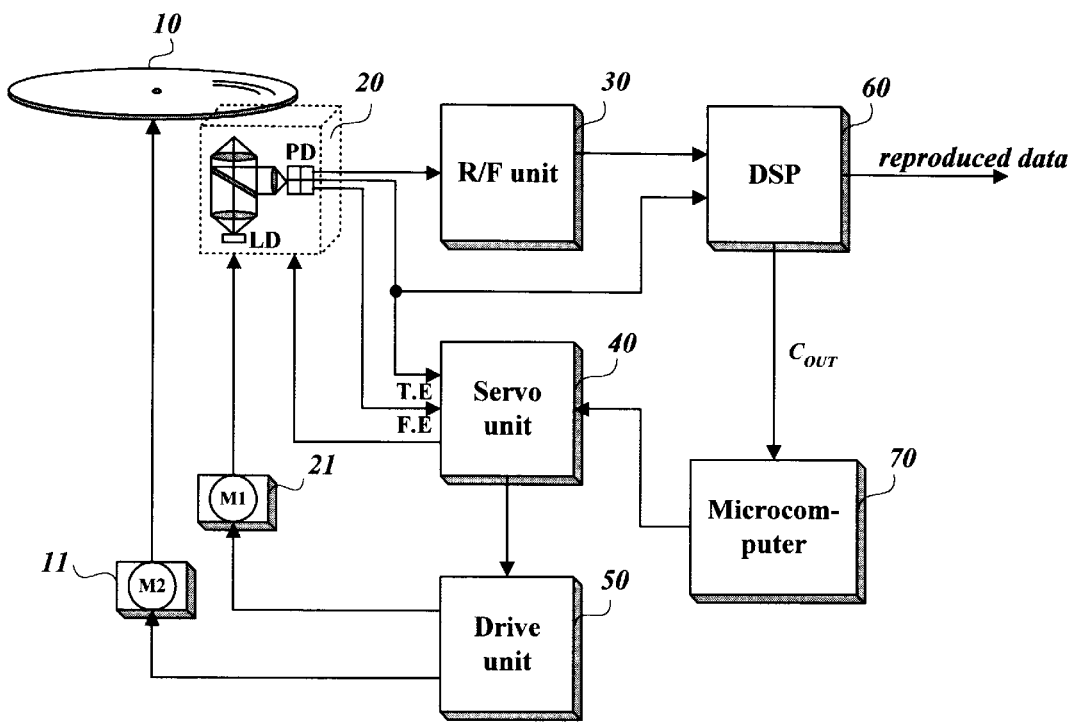
FIG. 1 is a block diagram of a conventional optical disk drive with eccentricity compensation capability.
Figure 2:
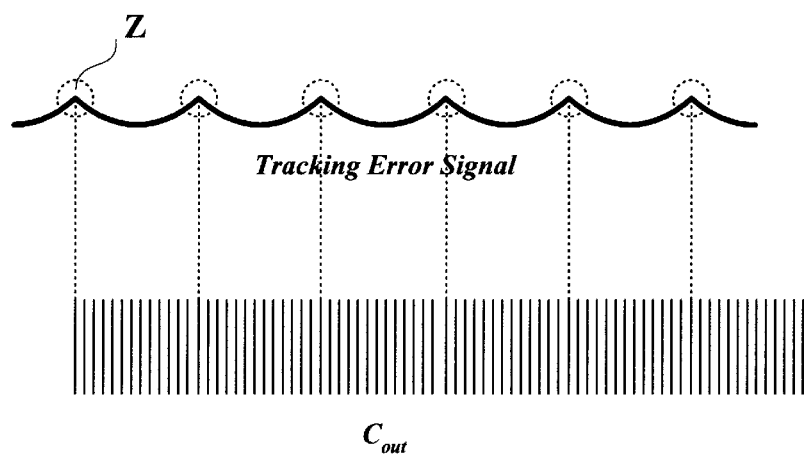
FIG. 2 is waveforms of tracking error signal produced by the optical pickup and track crossing pulse signal (Cout) produced by the digital signal processing unit.
Figure 3:
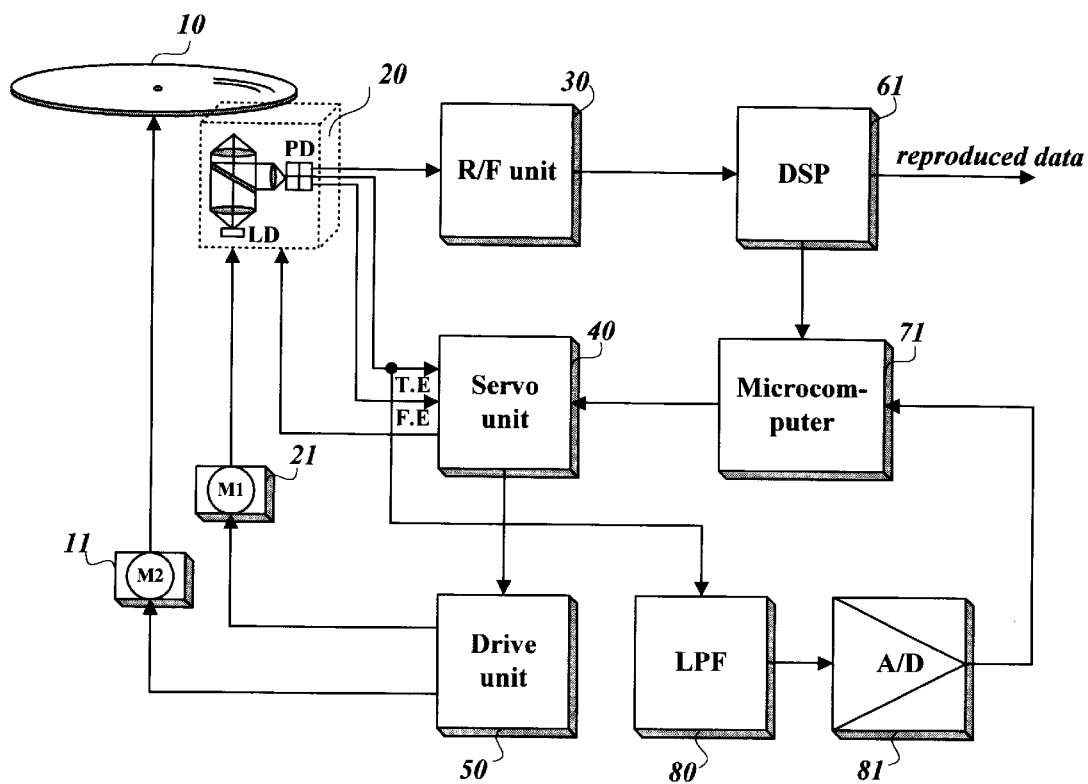
FIG. 3 is a block diagram of the optical disk drive embodying the present invention.

FIG. 3 shows a block diagram of an optical disk drive embodying the present invention, which contains all the components shown in FIG. 1 and additional two components, a low-pass filter 80 and an A/D converter 81. The low-pass filter 80 filters the tracking error signal outputted from the optical pickup 20 to reject high-frequency noise and the A/D converter 81 digitizes the low-pass filtered tracking error signal. All the components play the same functions as in the disk drive shown in FIG. 1, except for the digital signal processing unit 61 and the microcomputer 71.

Figure 4:
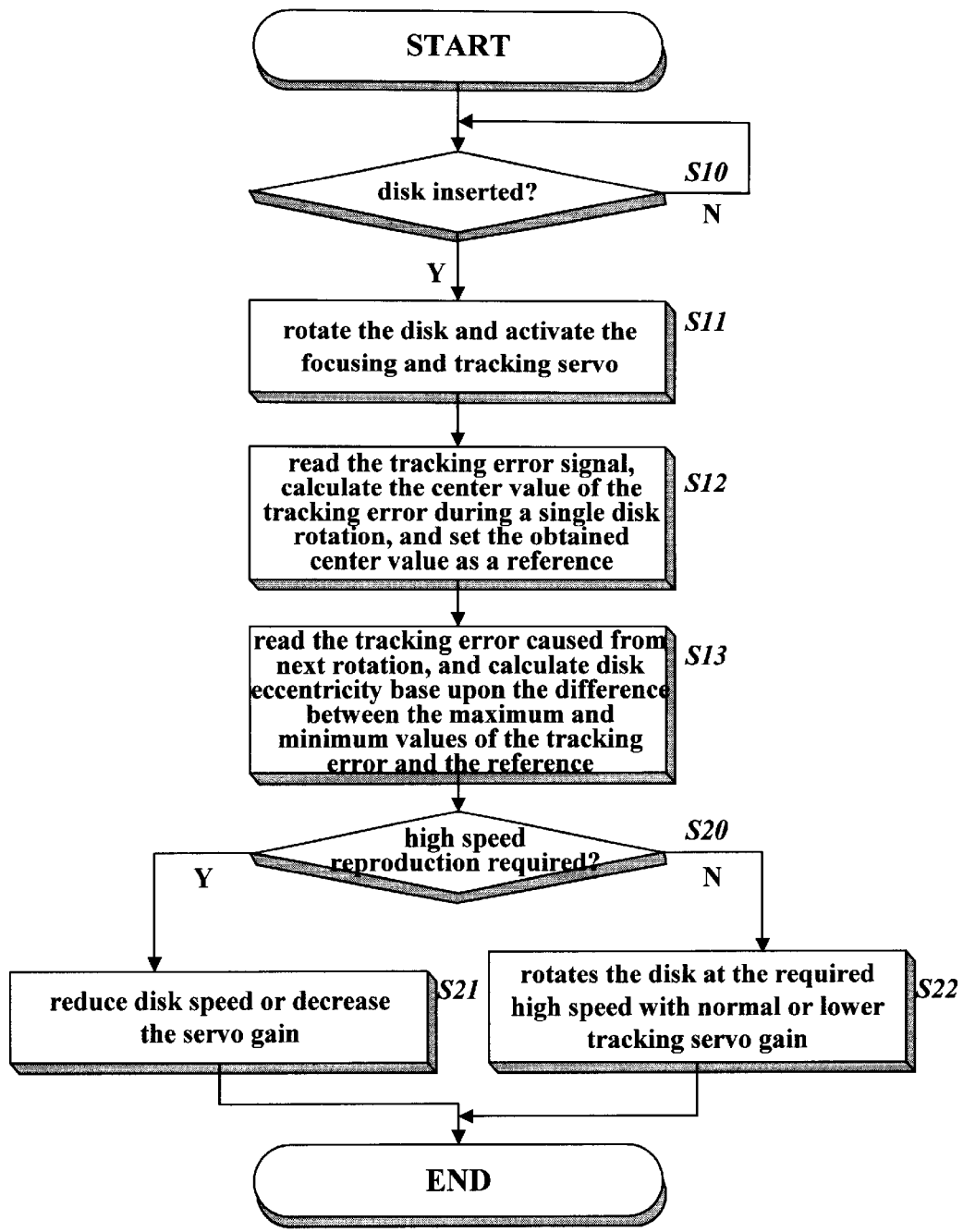
FIG. 4 is a flow chart of the method for measuring the eccentricity of an optical disk in accordance with an embodiment of the present invention.

FIG. 4 is a flow chart of the method for measuring the eccentricity of an optical disk in accordance with an embodiment of the present invention, which will be explained in detail with reference to FIG. 3.

When an optical disk 10 is inserted (S10), the microcomputer 71 commands the servo unit 40 to begin rotating the optical disk 10 and then activates the focusing and tracking servo (S11), so that the inserted disk 10 is rotated in CLV mode. The optical spot remains focused on the disk by the focusing servo and the center of the objective lens keeps following the center of the track by the tracking servo.

Figure 5A:
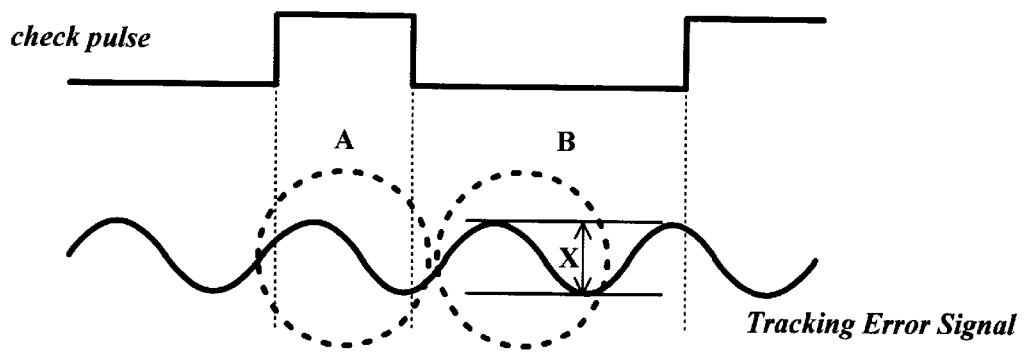
FIGS. 5A and 5B are waveforms of tracking error signal generated by the optical pickup.
Figure 5B:
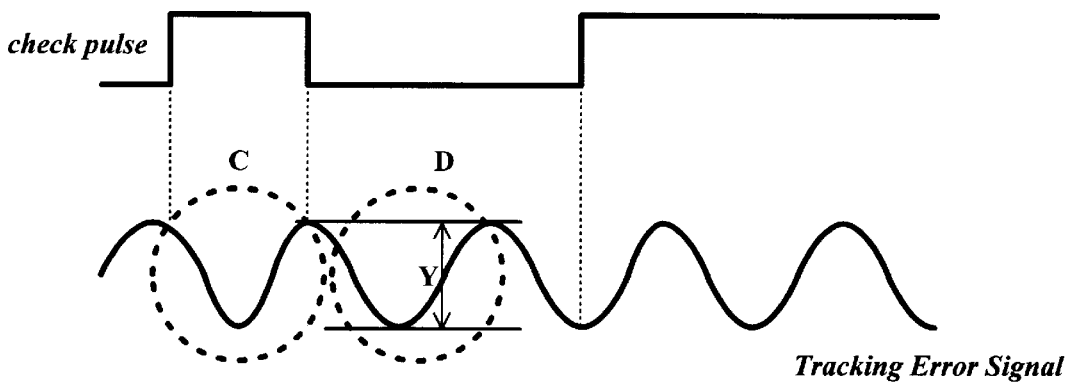

With focusing and tracking control activated, the tracking error signal generated by the optical pickup 20 is commonly of the waveforms shown in FIGS. 5A and 5B. The fundamental frequency of the tracking error signal is the rotation frequency of the disk. The low-pass filter 80 rejects high-frequency noise from the tracking error signal and the A/D converter 81 digitizes the low-pass filtered tracking error signal. The microcomputer 71 reads the digitized tracking error signal and calculates the center value of the tracking error during a single disk rotation. The obtained center value is set as a reference value (S12). The intervals marked A and C in FIGS. 5A and 5B show the duration during which the center value is calculated.

While the check pulse outputted by the microprocessor 71 is asserted, that is, during the intervals A and B, the tracking error signal is digitized and average digitized value is determined to the center value.

Once the reference value has been set, the microcomputer reads the digitized tracking error and compares the digitized tracking error values with the reference value during the subsequent disk rotation, that is, in the intervals marked B and D shown in FIGS. 5A and 5B. The disk eccentricity is calculated base upon the difference between the maximum and minimum values of the digitized tracking error and the reference value (S13).

With this method, the disk eccentricity can be measured irrespective of displacement of the objective lens with respect to the optical axis. This is because the center value of the tracking error is first obtained during a disk rotation and the deviation of tracking error from the center value is measured during the subsequent disk rotation.

The amplitude X in FIG. 5A shows relatively small disk eccentricity and the amplitude Y in FIG. 5B shows relatively large disk eccentricity.

The microcomputer 71 stores the measured disk eccentricity in an internal memory. When the measurement finishes, the microcomputer begins the reproduction of recorded data.

If high-speed disk rotation is required (S20), the microcomputer 71 examines whether the obtained eccentricity of the optical disk 10 exceeds an allowable limit (for example, 270 μm). If the limit is exceeded, the microcomputer 71 rotates the optical disk 10 at a speed lower than the required high speed for stable data reproduction (S21). Instead of lowering the rotation speed, the microcomputer 71 may increase the focusing/tracking servo gains while rotating the optical disk 10 at the given high speed, so that the data reproduction can be successfully performed in spite of the high disk eccentricity.

If the eccentricity of the optical disk 10 is within the allowable limit (270 μm), the microcomputer 71 rotates the optical disk 10 at the required high speed with normal or lower tracking servo gain (S22) so that stable servo performance is guaranteed.

Figure 6:
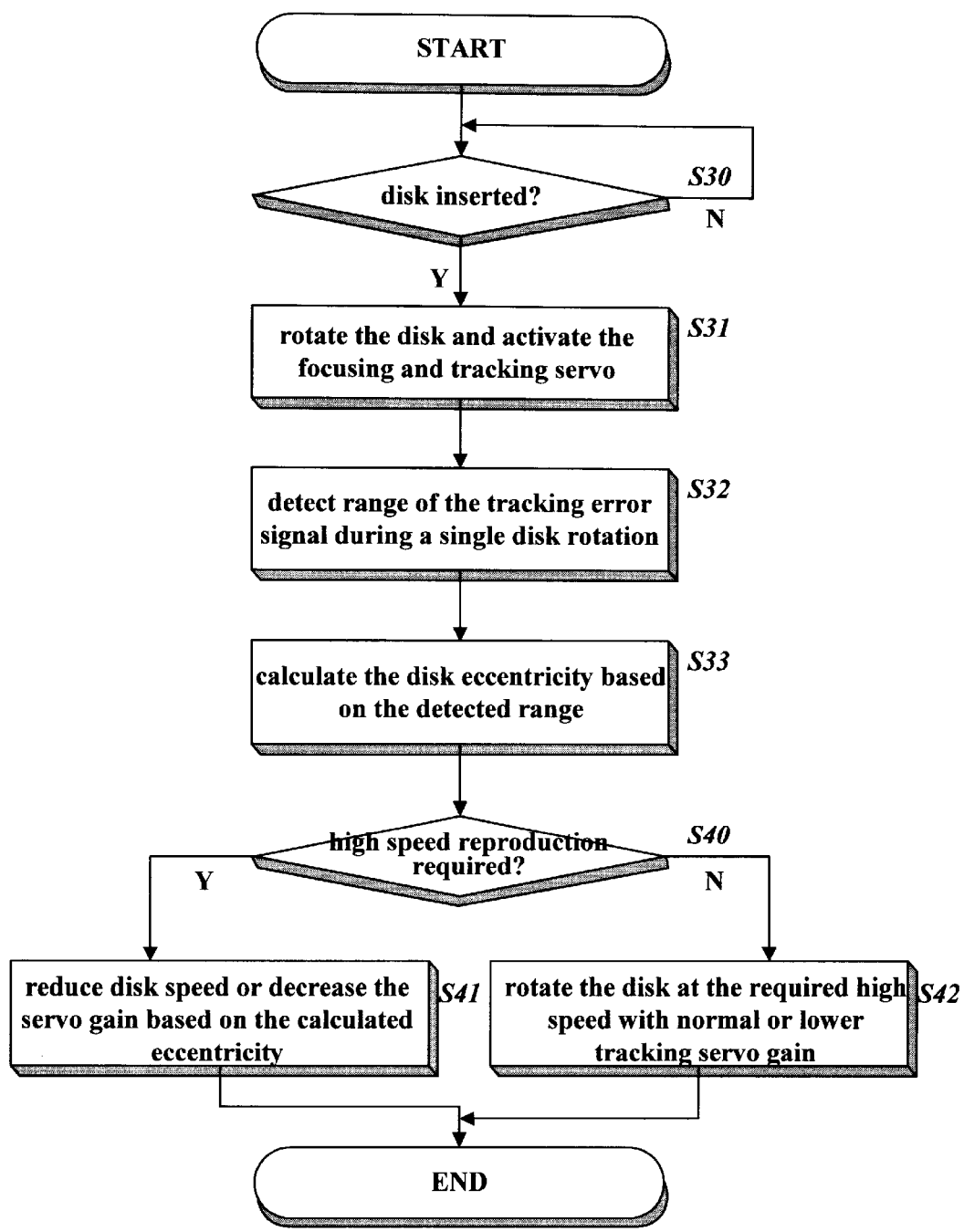
FIG. 6 is a flow chart of the method for measuring the eccentricity of an optical disk in accordance with another embodiment of the present invention.

FIG. 6 is a flow chart of the method for measuring the eccentricity of an optical disk in accordance with another embodiment of the present invention. In Step S32, the microcomputer receives the digitized tracking error and measures the amplitude of the digitized tracking error during a single disk rotation. Based on the measured amplitude, the microcomputer 71 calculates the disk eccentricity (S33) and stores it in an internal memory. The other steps are similar to those in FIG. 4.

The present invention provides a method and apparatus for precisely measuring the eccentricity of an optical disk and for adjusting the servo gains accordingly. With no consideration of the location of optical pickup, the center of the objective lens can be found precisely when the center of the lens deviates from the optical axis. Due to precise measurement of the disk eccentricity, the rotation speed of the optical disk can be appropriately adjusted in accordance with the disk eccentricity and thus stable data reproduction can be obtained and also a track slip may be prevented.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for measuring the eccentricity of an optical disk, comprising the steps of:

activating tracking servo while the optical disk is rotating;

detecting the center value of tracking error signal and setting the detected center value as a reference value; and measuring the eccentricity of the optical disk by comparing the center value and the tracking error signal received right after setting of the reference value.

2. The method set forth in claim 1, wherein the tracking error signal received right after setting of said reference value is compared with said reference value and the eccentricity of the optical disk is measured from the deviation of the tracking error from said center value.

3. The method set forth in claim 1, further comprising a step of:

performing a compensation process based upon the measured eccentricity of the optical disk, in the case of high-speed disk rotation.

4. The method set forth in claim 3, wherein said compensation process adjusts the operating characteristic of servo system based upon the measured eccentricity of the optical disk.

5. The method set forth in claim 4, wherein the adjusted operating characteristic of servo system is the tracking servo gain.

6. The method set forth in claim 3, wherein said compensation process decreases the rotation speed of the optical disk lower than said high speed, based upon the measured eccentricity of the optical disk.

7. A method for measuring the eccentricity of an optical disk, comprising the steps of:

activating tracking servo while the optical disk is rotating;

detecting the amplitude of tracking error signal; and measuring the eccentricity of the optical disk based upon the detected amplitude of tracking error signal.

8. An apparatus for measuring the eccentricity of an optical disk, comprising:

a drive unit to rotate the optical disk;

signal processor to reproduce recorded signal from the optical disk;

servo unit to performe focusing and tracking servo for the optical disk rotated by said drive means; and control unit to detect the amplitude of tracking error signal and for measuring the eccentricity of the optical disk based on the detected amplitude while said servo means is activated.

9. The apparatus set forth in claim 8, further comprising a low-pass filter to reject noise contained in the tracking error signal.

10. The apparatus set forth in claim 8, further comprising an A/D converter to digitize the tracking error signal.

11. The apparatus set forth in claim 8, wherein the eccentricity of the optical disk is detected using the tracking error signal outputted right after a reference value is set from the tracking error signal digitized during a particular interval.

12. The apparatus set forth in claim 10, wherein the eccentricity of the optical disk is detected using the tracking error signal outputted right after a reference value is set from the tracking error signal digitized during a particular interval.

\* \* \* \* \*